(12) United States Patent  (10) Patent No.: US 8,247,120 B2
Crumm et al.  (45) Date of Patent: Aug. 21, 2012

(54) FUEL CELL SYSTEM INCLUDING A FUEL MODULE

(75) Inventors: Aaron T. Crumm, Ann Arbor, MI (US); John Muczynski, Ypsilanti, MI (US); Mike Gorski, Ann Arbor, MI (US); Nathan Ernst, Ann Arbor, MI (US); Jason Krajcovic, Ann Arbor, MI (US)

(73) Assignee: Adaptive Materials, Inc., Ann Arbor, MI (US)

( * ) Notice: Subject to any disclaimer, the term of this patent is extended or adjusted under 35 U.S.C. 154(b) by 426 days.

(21) Appl. No.: 12/428,165

(22) Filed: Apr. 22, 2009

(65) Prior Publication Data

US 2010/0273069 A1 Oct. 28, 2010

(51) Int. Cl.
 *H01M 8/04* (2006.01)
(52) U.S. Cl. ......... 429/428; 429/411; 429/443; 429/515
(58) Field of Classification Search .................. 429/408, 429/410–411, 428, 443, 448, 515
 See application file for complete search history.

(56) References Cited

U.S. PATENT DOCUMENTS

| 7,291,191 | B2 | 11/2007 | Kaye |
| 7,318,969 | B2 | 1/2008 | Tajima |
| 2002/0197522 | A1 | 12/2002 | Lawrence et al. |
| 2005/0008908 | A1 | 1/2005 | Kaye et al. |
| 2006/0008687 | A1 | 1/2006 | Kaye et al. |
| 2006/0014070 | A1 | 1/2006 | Kaye et al. |
| 2007/0189939 | A1* | 8/2007 | Rohrbach et al. ............ 422/211 |
| 2008/0077802 | A1 | 3/2008 | Richardson et al. |

* cited by examiner

*Primary Examiner* — Thanhha Pham
(74) *Attorney, Agent, or Firm* — Endurance Law Group PLC (57) ABSTRACT

A fuel cell system includes an energy conversion module and a fuel module that is detachable from the energy conversion module. The fuel module includes a fuel tank, a fuel module identification member including fuel module data and a fuel filter member. The control module is configured to access the fuel module data from the fuel module identification member. The fuel cell stack is configured to utilize the refined fuel to generate electrical energy.

13 Claims, 6 Drawing Sheets

FUEL CELL SYSTEM INCLUDING A FUEL MODULE

GOVERNMENT INTERESTS

This invention was made with government support under contract number W909MY-08-C-0025, awarded by the Department of Defense. The government has certain rights in this invention.

FIELD OF THE INVENTION

This application is related to fuel modules for solid oxide fuel cell systems

BACKGROUND

The statements in this section merely provide background information related to the present disclosure and may not constitute prior art.

Solid oxide fuel cells can generate electricity by electrochemically reacting an oxidant and fuel. Solid oxide fuel cells can be adapted to operate utilizing various fuel compositions including fuels that are commercially available. Exemplary fuels include various hydrogen-containing molecules and mixtures of hydrogen-containing molecules.

Hydrocarbon-based fuels such as fuels that contain propane, butane, and blends of propane and butane, with or without other components are commercially available worldwide. Solid oxide fuels cells can utilize these hydrocarbon-based fuels to generate electricity. Using fuel that is locally commercially available can be advantageous over using fuel that is specifically formulated for fuel cells in that separate distribution networks do not need to be established when utilizing fuels that are already commercially available in the marketplace.

The composition of commercially available fuel can differ in fuel grade, composition of hydrocarbons, fuel purity level, poison level, contamination level, particulate level, and level of fuel additives. In particular, fuel compositions can differ between grades or classifications of fuels or can different within a grade or a classification, that is, a grade or classification specification can allow for ranges of fuel component levels.

For example, in the United States there are multiple grades of commercial propane containing varying amounts of propane, butane, and other light hydrocarbons. Further, fuel compositions can differ based on different fuel composition standards in different parts of the world. For example, the composition of liquefied petroleum gas ('LPG'), an exemplary solid oxide fuel cell fuel that typically includes propane and/or butane, can vary by a broad range based on regional or country-specific standards.

Fuel can be refined prior to utilization for electrochemical reactions within a solid oxide fuel cell. An internal fuel refining member (for example, a fuel filter) can convert a raw fuel introduced to the fuel cell system to a refined fuel. The refined fuel can provide increased fuel cell performance and fuel cell operating life when compared with the unrefined fuel. The fuel filter and refinement method can be optimized based on the raw fuel composition, impurities levels, and fuel additives. Further, system controls can be optimized based on the raw fuel composition and based on the fuel cell system's capability in refining the raw fuel to the refined fuel.

Fuel can be routed through a fuel filter prior to being routed to the fuel cell to remove potential poisons, contaminants, non-fuel molecules, debris, or other undesirable components contained within the raw fuel. However, if the fuel filter does not have sufficient poison removal properties to refine the fuel, poisons, debris, contaminants, or additives can pass through the fuel filter and degrade the operational performance of the fuel cells.

Since commercially available fuels vary widely in composition, filter design and filtering media composition can vary widely for optimization with the specific fuel composition. For example, a fuel filter may not efficiently remove poisons if the fuel filter is incompatible with the specific fuel utilized or if the fuel filter is utilized beyond the fuel filter's operational lifetime. Further, the wide range of fuel compositions can lead to an undesirably high probability that a fuel filter that is not sufficiently compatible with the fuel composition will be utilized within the fuel cell system, due to, for example, misidentification of fuel or user error. Still further, in order to accommodate a wide-range of fuel compositions, fuel filters can be over-engineered with filtering or poison removal materials that are not utilized for the specific fuel composition, thereby increasing the cost of the fuel filter.

Therefore, improved fuel cell systems utilizing commercially available fuels and improved methods for operating fuel cells with commercially available fuels are needed.

It should be understood that the appended drawings are not necessarily to scale, presenting a somewhat simplified representation of various preferred features illustrative of the basic principles of the invention. The specific design features of the fuel cell will be determined in part by the particular intended application and use environment. Certain features of the illustrated embodiments have been enlarged or distorted relative to others for visualization and understanding. In particular, thin features may be thickened for clarity of illustration. All references to direction and position, unless otherwise indicated, refer to the orientation of the solid state electrochemical device illustrated in the drawings.

SUMMARY

In accordance with exemplary embodiments, a fuel cell system includes a fuel module and an energy conversion module. The fuel module includes a fuel tank, a fuel module identification member, and a fuel filter member. The fuel tank includes raw fuel stored therein and the fuel filter member is configured to convert raw fuel to a refined fuel. The fuel module identification member includes fuel module data. The energy conversion module includes a control module and a fuel cell. The control module is configured to access the fuel module data from the fuel module identification member. The fuel cell stack is configured to utilize the refined fuel to generate electrical energy. The fuel module is detachable from the energy conversion module.

DETAILED DESCRIPTION OF THE EMBODIMENTS

Figure 1A:
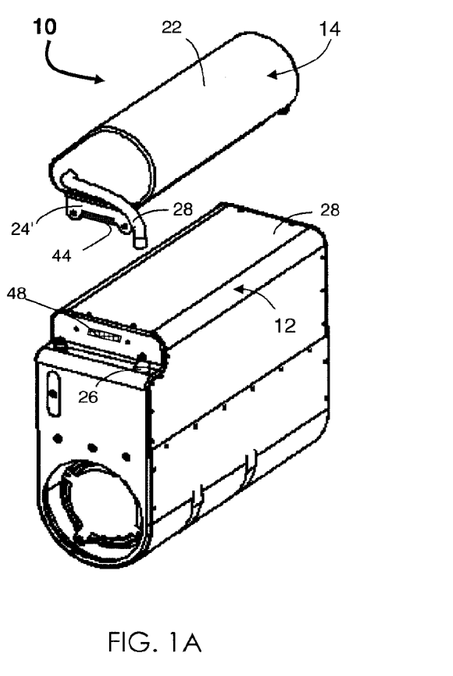
FIGS. 1A, 1B and 1C depict prospective views of a fuel cell system in accordance with an exemplary embodiment of the present disclosure.
Figure 1B:
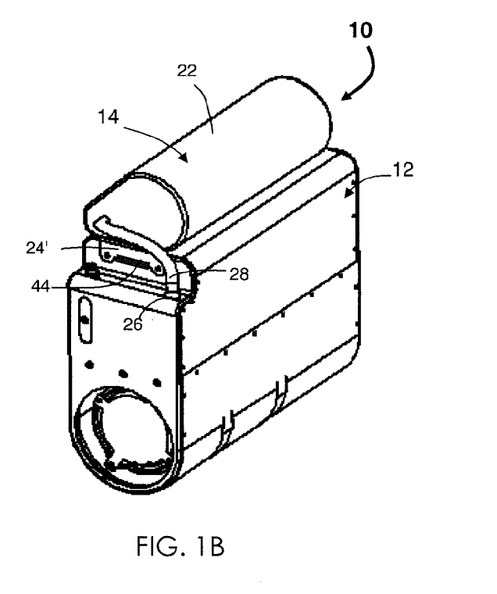
Figure 1C:
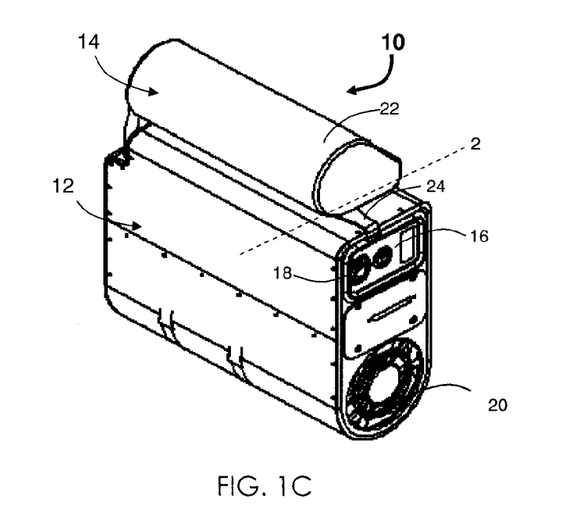

FIGS. 1A, 1B, and 1C show a fuel cell system 10. The fuel cell system 10 includes an energy conversion module 12 and a fuel module 14 that is detachable from the energy conversion module 12. Detachable, as used herein, refers to functionality that allows a user to disengage the fuel module 14 from the energy conversion module 12 without destroying or damaging components of the fuel cell system 10, for example, without damaging an outer casing 22 of the fuel module 14.

The exemplary fuel cell system 10 is connected by coupling a fuel module exit port 28 of the fuel module 14 to an energy conversion module receiving port 26 of the energy conversion module 12.

The energy conversion module 12 is sealed to the fuel module 14 for routing fuel between the energy conversion module 12 and the fuel module 14. Further, bracket members 24 and 24' are provided for coupling the fuel module 14 to the energy conversion module 12, wherein the bracket members 24 and 24' provide orientation and positioning of the fuel module 14 relative to the energy conversion module 12.

In alternative embodiments, other orientation members can be utilized to orient the fuel module 14 relative to the energy conversion module 12. Exemplary alternative orientation members include protruding members, recessed portions, interlocking members, tracks, and the like.

In the exemplary fuel cell system 10, the fuel module 14 is attached to the outer casing 22 of the energy conversion module 12. In alternate embodiments, the fuel module can be detachably coupled to locations inside the outer casing. Alternate embodiments include installation of the fuel filter remote from either the fuel tank or the fuel cell system. Further, in alternate embodiments, other fastening and attachment members can be utilized to allow a user to attach the fuel module to the energy conversion module with or without additional tools. In one embodiment, the fuel cell system is designed such that a tool such as a screwdriver or wrench can be utilized to detach and reattach the fuel module from the energy conversion module.

Figure 3:
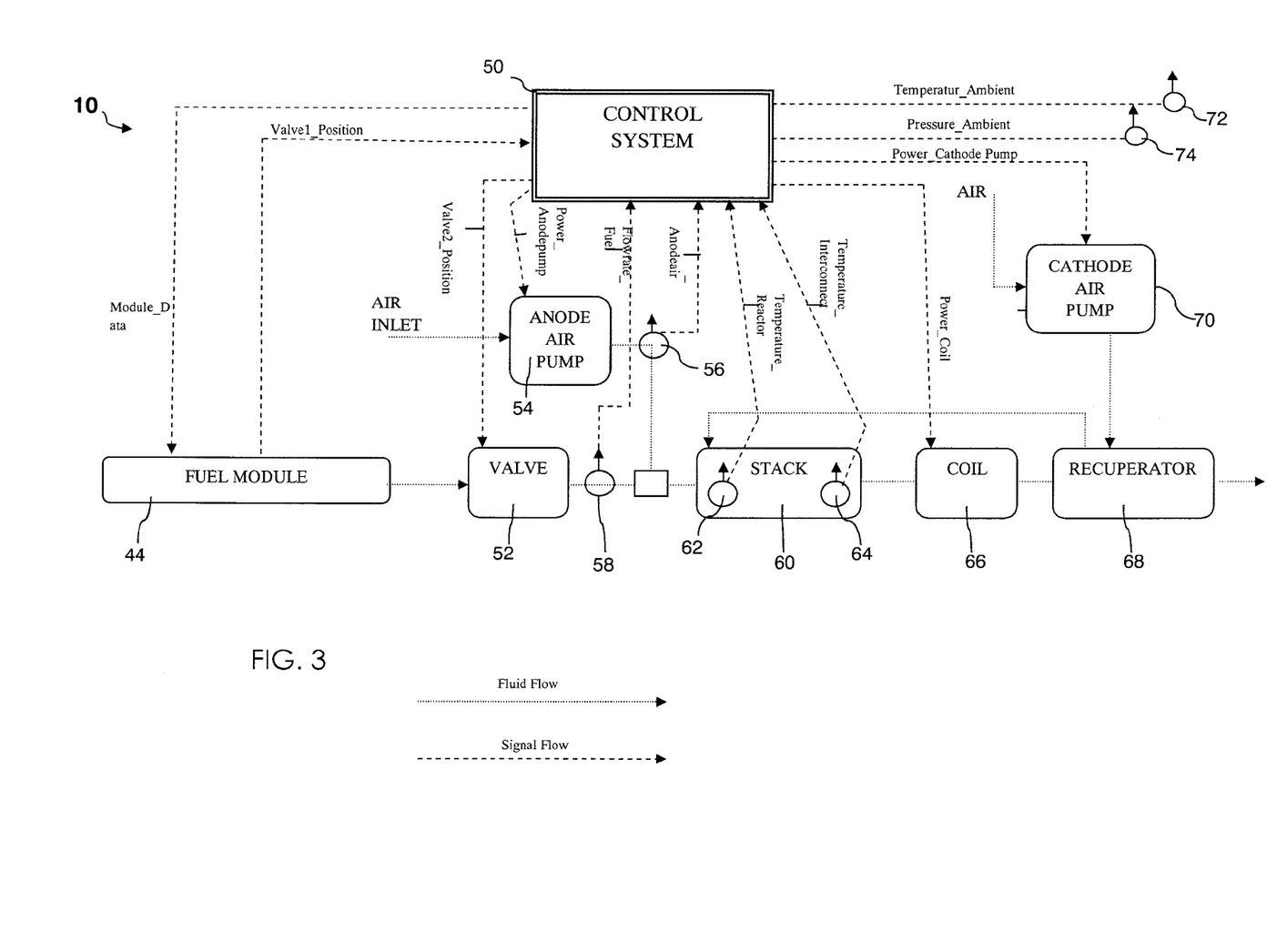
FIGS. 3 and 4A depicts a schematic fluid and signal flow diagram of the fuel cell system of FIG. 1.

The energy conversion module 12 further includes a faceplate 16 and an air inlet 20. The faceplate includes a power port 18. The energy conversion module 12 can generate electricity by reacting fuel from the fuel module 14 and atmospheric oxygen inputted at the air inlet 20 in a fuel cell stack 60 (FIG. 3). The electricity is routed from the fuel cell stack 60 to the power port 18, wherein the electricity can be provided for use by an external device (not shown).

The fuel module 14 further includes a fuel module identification member 44 configured to signally couple with a communications port 48 of the energy conversion module 12.

Figure 2:
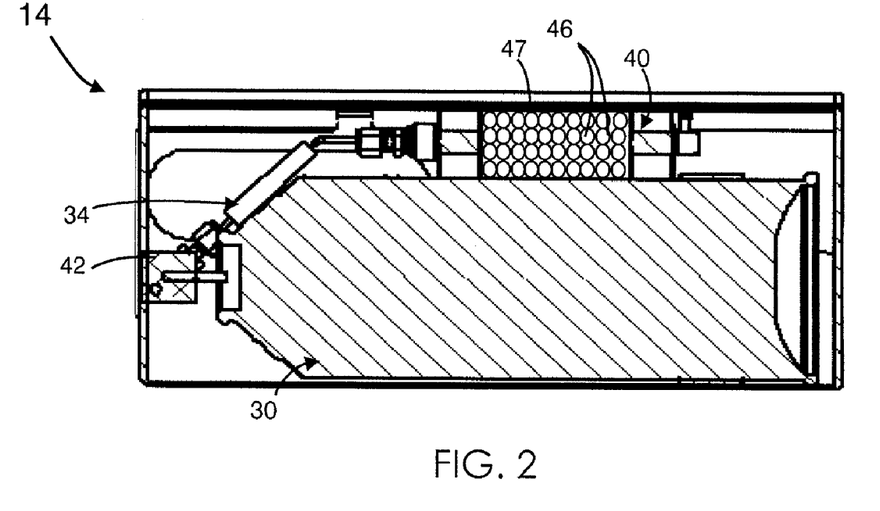
FIG. 2 depicts a cross-sectional view of the fuel cell system of FIG. 1.

FIG. 2 shows the fuel module 12 along a cross-section 2. The fuel module 12 includes a fuel tank 30, a fuel tank 30', a fuel conduit 32, a fuel valve 34, a fuel filter 40, and a fuel outlet 42.

The fuel tank 30 each define an inner chamber with raw fuel disposed therein. The fuel tank 30 can comprise a commercially available fuel tank and can be made from material generally compatible with the raw fuel. The terms "raw fuel" as used herein refer to fuel in a state before being processed for use a fuel cell, for example being processed within a fuel filter. The raw fuel can include any of several commercially available fuels that can be utilized in solid oxide fuel cells to generate electricity. The specific commercially available fuel can vary widely and can be a standard fuel composition for a specific region of the world.

Exemplary fuels include a wide range of hydrocarbon fuels. The raw fuel can contain one or more components that can be partially or completely removed prior to routing the fuel to a fuel cell stack 60 (FIG. 3) of the fuel cell system 10. In various embodiments of the present disclosure the amount of undesirable components removed by the fuel filter member can vary based on the specific type of raw fuel utilized. For example, in one embodiment, the fuel filter member can remove between one part per million and one hundred parts per million undesirable components from the raw fuel.

Exemplary undesirable components contained within the raw fuel can include sulfur containing molecules and particulates. The raw fuel also can include mixtures comprising combinations of various component fuel molecules, examples of which include gasoline blends, a liquefied natural gas, JP-8 fuel and diesel fuel. Further, in various embodiments, the fuel cell system can utilize fuels having various grades, hydrocarbon ratings, refinement levels and purity levels. Thus, the exact fuel composition is to be understood as to be not limiting on the present disclosure. Exemplary fuels comprise one or more other types of fuels, such as alkane fuels, for example, methane, ethane, propane, butane, pentane, hexane, heptane, octane, nonane, decane, along with hydrocarbon molecules with greater number of carbon atoms such as cetane, and the like, and can include non-linear alkane isomers. Further, other types of hydrocarbon fuel, such as partially and fully saturated hydrocarbons, and oxygenated hydrocarbons, such as alcohols and glycols, can be utilized as raw fuel. In one embodiment, the raw fuel comprises an ethyl mercaptan additive, for example, the raw fuel can comprise propane fuel with the ethyl mercaptan additive. In one embodiment the raw fuel contains other sulfur containing molecules, for example, thiophenes, hydrogen sulfides or other mercaptans, in addition to or instead of ethyl mercaptan.

Raw fuel can be routed from the fuel tank 30 through the fuel valve 34. The fuel valve 34 is configured to control whether raw fuel from the fuel tank 30 is routed to the fuel filter member 40 and to control the rate of raw fuel being supplied from the fuel tank 30 to the fuel filter member 40. The fuel valve 34 is configured to receive a signal ('VALVE1_POSITION') (FIG. 3) from the control system 50 to control valve actuation and thus control a raw fuel flow rate through the fuel valve 34.

The fuel filter member 40 is utilized to process raw fuel to a refined fuel. The fuel filter assembly 18 includes filtering media 46 disposed within an inner chamber 47. The term "refined fuel" as used herein refers to fuel in a state after being processed within the fuel filter member 40. The filtering media 46 can comprise one or more filtering or absorbent materials. The filtering media 46 can be in one of many exemplary forms including filter paper, filter paper with reactive material disposed thereon, a packed bed, beads, foams, fibers, and like forms. Sulfur containing molecules such as ethyl mercaptan additive and other undesirable components can be filtered, captured, or absorbed by the filtering media. Exemplary absorbent components can include silica, for example, silica in the form of silica gel, alumina, and activated copper oxide. Further, the absorbent components can include both components that chemically bond with molecules and components that can physically sieve molecules into storage channels. The fuel filter media 46 can further include sodium oxide, zinc oxide, silver oxide, calcium oxide, iron (III) oxide, copper and copper oxides, and magnesium oxide, and can include mixtures with water or aqueous forms of the foregoing materials. Although exemplary material is described for an exemplary fuel filter member 40, one benefit of the fuel cell system 10 is that it can utilize different fuel filters for operation with different types of fuel and therefore, is adaptable to fuel filter members that vary greatly from the exemplary fuel filter member 40.

Fuel is routed from the fuel filter member 40 to the fuel module exit port 28 and out of the fuel module 14 to the energy conversion module 12.

In an exemplary embodiment, the fuel module identification member 44 utilizes single-wire communication to communicate with the control system 50 by sending information to and receiving information from a communications bus (not shown) of the control system 50 via the communications port. The fuel module identification member 44 sends information to the communications bus during a first time period of each loop cycle and receives information from the communications bus during a second time period of each loop cycle. The specific communications type utilized can depend on, for example, a desired performance level, desired control speed, desired amounts of data transferred, and desired reliability levels. In one embodiment, the control system 50 utilizes a 1-Wire device from Maxim Integrated Products, Inc. The interconnected circuits or devices employ other interface protocols, such as RS-232, RS-422, RS-423, RS-485, J1708, SPI, Microwire, and I2C can be utilized in other exemplary embodiments.

The fuel module identification member includes a memory device that can store information including preconfigured information and information received from the communications bus and stored for later retrieval. The memory device further includes encrypted handshake data that is communicated to the control system 50. The encrypted handshake data is accessed by the control system 50 to authenticate the fuel module 14. When the control system 50 cannot authenticate the fuel module 14, the control module 50 will control the fuel valve 52 to maintain a shut position and not accept fuel from the fuel module. Thus, the fuel cell system 10 can prevent the use of unauthorized or counterfeit fuel that can degrade operational performance of the fuel cell system.

In an exemplary embodiment, the useful operating life of the fuel filter member 40 is matched with the total amount of fuel stored in the fuel tank 30 such that useful operating life of the fuel filter member 40 is substantially depleted when a level of fuel equal to the total capacity of the fuel tank 30 is depleted. Matching the fuel filter life with the fuel capacity of the fuel module, provides a cost advantage in that excess absorbent material is not wasted within the fuel filter member. Further, the fuel filter member 40 is engineered for the fuel composition of raw fuel within the fuel tank 30 and provides appropriate refinement of the raw fuel such that the refined fuel will not degrade operation performance of the fuel cells within fuel cell system 10 while not including absorbent or filtering material that is not needed for the specific raw fuel composition. In one embodiment, the useful life of the fuel filter member 40 is tracked on the fuel module identification member. The useful life of the fuel filter member can be measured at a fuel distribution center during refueling of the fuel module to determine when fuel filter replacement is needed. Further, in one embodiment, the useful life of the fuel filter member can be monitored by the control system 50 during and the control system 50 can provide fuel filter life information to the user and can notify the user when filter replacement is required.

In one embodiment, the fuel module identification member 40 includes software that is uploaded to the energy conversion module 12. The uploaded software can include updates, patches, and software optimized for the specific fuel module.

Referring to FIG. 3 the fuel cell system 10 includes a control system ('CONTROL SYSTEM') 50, a fuel cell stack 60 ('STACK') disposed within an insulative body (not shown), an anode air pump 56 ('ANODE AIR PUMP'), a cathode air pump 70 ('CATHODE AIR PUMP'), a fuel valve 34 ('VALVE'), and a recuperator 68 ('RECUPERATOR'). The insulative body comprises thermally insulative material capable of withstanding the operating temperatures of the fuel cell stack 60, that is, temperature of up to 1000 degrees Celsius. The recuperator 68 comprises a heat exchange manifold for transferring heat from fuel cell exhaust gas to ambient air inputted to the fuel cell stack 60.

The fuel cell system 10 further includes a plurality of sensors providing signals to the control system 50. Signals monitored by the control system 50 include an ambient pressure (PRESSURE_AMBIENT) from an ambient pressure sensor 74, an ambient temperature ('TEMPERATURE_AMBIENT') from an ambient temperature sensor 72, actual fuel flow rate ('FLOWRATE_FUEL') from a fuel flow rate sensor 54, an actual anode air flow rate ('FLOWRATE_ANODEAIR') from anode air flow rate sensor 52, a reactor temperature ('TEMPERATURE_REACTOR') from a temperature sensor 62 proximate internal reformation reactors disposed within fuel cell tubes of the fuel cell stack 60, and an interconnect temperature ('TEMPERATURE_INTERCONNECT') from a temperature sensor 64 disposed proximate interconnect members at the exhaust ends of fuel cell tubes of the fuel cell stack 60.

The control system 50 is configured to provide signals to send commands to component actuators of the fuel cell system 10. The signals commanded by the control system 50 include the first valve position ('VALVE1_POSITION'), a second valve position ('VALVE2_POSITION'), an anode air pump power level ('POWER_ANODEPUMP'), a coil power ('POWER_COIL'), and a cathode air pump power level ('POWER_CATHODEPUMP').

The cathode air pump 70 pumps ambient air through the recuperator 68 and into the fuel cell stack 50 and an exhaust fan (not shown) pulls exhaust gases ('EXHAUST') away from the fuel cell stack 60. The fuel valve 52 controls fuel flow from the fuel module 14 to the fuel cell stack 40 and the anode air pump 54 pumps ambient air to the fuel cell stack 40, wherein the ambient air and fuel are combined. The coil 66 comprises a resistant heating coil that can heat fuel and air that pass through the fuel cell stack 60 to combust the air and fuel.

The fuel cell stack 60 comprises a plurality of solid oxide fuel cell tubes, along with various other components, for example, air and fuel delivery manifolds, current collectors, interconnects, and like components, for routing fluid and electrical energy to and from the component cells within the fuel cell stack 60. The solid oxide fuel cell tubes electrochemically transform the fuel gas into electricity and exhaust gases. The actual number of solid oxide fuel cell tubes depends in part on size and power producing capability of each tube and the desired power output of the SOFC. Each solid oxide fuel cell includes an internal reformer disposed therein. The internal reformer can refine fuel such that the reformed fuel can be reacted at an anode of the fuel cell tube. For exemplary fuel cell tubes, and stack see U.S. patent application Ser. No. 10/979,017 to Crumm et al, which is hereby incorporated by references in its entirety and U.S. patent application Ser. No. 10/991,268 to Crumm et al., which is hereby incorporated by reference herein in its entirety.

The control system 50 comprises a microprocessor configured to execute a set of control algorithms, comprising resident program instructions and calibrations stored in storage mediums to provide the respective functions. The control system 50 can monitor input signals from sensors disposed throughout the fuel cell system 10 and can execute algorithms in response to the monitored input signals to execute commands to control power, reactant flows, and component operations of the fuel cell system 10. Monitor communications bus created with tank one-wire chips, not just sensor inputs.

A fuel module data signal ('MODULE_DATA') is communicated between the fuel module identification member 44 of the fuel module 44 and the control system 50. The module identification signal comprises filter assembly information such as component signals shown in FIG. 4A including a fuel module lifespan capacity level ('LIFESPAN CAPACITY'), a chamber volume level ('CHAMBER VOLUME'), a remaining filter life level ('FILTER LIFE'), a raw fuel type ('FUEL TYPE'), a fuel tank capacity ('FUEL TANK CAPACITY'), a remaining fuel level ('FUEL REMAINING'), and shelf life parameter for storage sensitive filter media ('SHELF LIFE DATE').

Figure 4A:
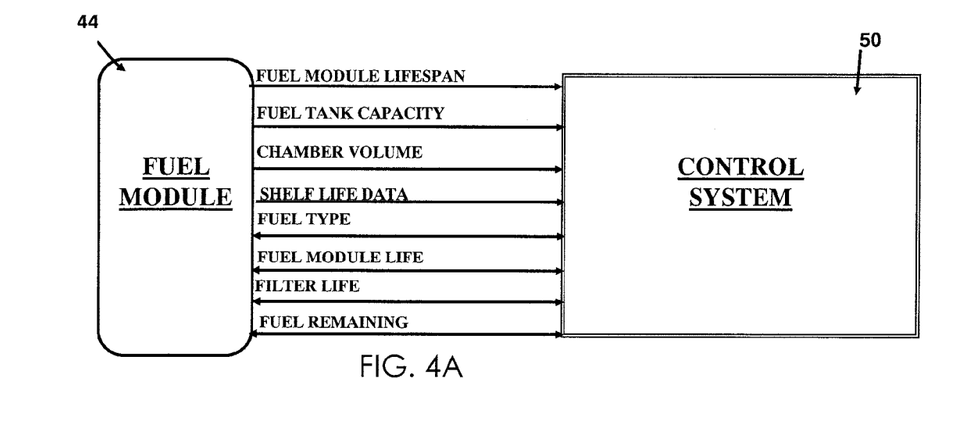

The lifespan capacity level represents an overall amount of useable life of the fuel module and can be determined based the remaining fuel level or the remaining filter life. The exemplary lifespan capacity level is a fixed value stored (i.e., factory configured value) in the data storage media of the filter data module 80. In one embodiment, the lifespan capacity level can include multiple values, wherein each value contains a lifespan capacity level for a type of fuel utilized within the fuel cell system 10. The lifespan capacity level can be received by the control system 50. The lifespan capacity level can be utilized by the control system in various algorithms, calculations and/or look-up tables as will be described in further detail below. In alternate embodiments, the filter data can further include override data for near end of filter life in critical applications, fuel cell system operation history and variable lifespan based on type of fuel tank, fuel manufacturer or batch purity, and location or region-based fuel variations.

The fuel type indicates the raw fuel composition that is supplied from the fuel tank 30. The control system 50 can utilize the raw fuel type to determine a control scheme for operating the fuel cell stack 10. For example, the control system 50 can determine air to fuel ratios within the fuel cell system based on the raw fuel type. Further, the control system 50 can operate utilizing a raw fuel even when the fuel filter member is passed its useful life when the raw fuel is not of a type that will significantly degrade operational lifetime of the fuel cell stack 10. The control system 50 can also operate utilizing a raw fuel even when the fuel filter member is passed its useful life when the application for critical applications either with or without operator interaction.

The chamber volume level indicates the amount of fluid, for example, ambient air that can occupy the fuel filter chamber 47 during operation of the fuel filter member 40. The fuel filter member 40 can regulate fluid flow by maintaining the pressure level within the pressure band, and therefore a separate regulator component is not required for accurate pressure regulator. During operation of the fuel filter member 40, air passes into the filter until a pressure (hereafter, pressure A) is registered, and then the valve 34 is subsequently shut. The fuel cell system converts the fuel within the fuel filter displaced volume until a lower pressure level (hereafter, pressure B) is reached within the chamber 47 of the fuel filter member 40. When pressure value B is reached, the valve between the fuel tank and fuel filter opens and the chamber 47 is pressurized up to pressure A. Therefore, the chamber volume is utilized by the control system 50 to determine values within feedback control algorithms and values for controlling the fuel valve 52 to provide selected levels of fuel pressure to the downstream fuel cell stack 60.

The remaining filter life level indicates a remaining filtering capacity of the fuel filter member 40. The fuel tank capacity indicates overall fuel storage volume within the fuel tank 30. The remaining fuel level indicates a level of raw fuel remaining within the fuel tank 30 available for utilization by the fuel cell stack 60.

Each of the fuel level remaining, the filter life remaining, and the fuel module life remaining (each of which will be general designated Life Remaining) can be updated at each loop cycle time N (hereafter, Life Remaining (N)) and is continually received by control system 50 such that the control system 50 utilizes the Life Remaining (N) to determine a Life Remaining for a next loop cycle time (N+1) according to equation (1), below:

$$\text{Life Remaining}(N) - \text{Usage}(N) = \text{Life Remaining}(N+1) \quad (1)$$

In one embodiment, the usage (N) value is a fixed value such that the control system 50 counts down remaining filter life in fixed increments during each loop cycle. In one embodiment, the usage (N) value is calculated based on the fuel flow rate ('FLOW RATE FUEL') detected by the fuel flow sensor 58. In one embodiment, the usage (N) value can be determined based on the type of raw fuel or based on both the type of raw fuel and the filtering capability of the fuel filter member 40, wherein the filtering capability of the fuel filter member 40 is selected based on the type of raw fuel. In alternative embodiments, other control conditions within the fuel cell system 10 such as temperature levels and other fluid flow rates within the fuel cell system are utilized. In an exemplary embodiment, the control system 50 is continually comparing the remaining filter life to a first threshold filter life and the control system 50 is configured to command system shutdown (by discontinuing fueling to the fuel cell stack 60) when one of the fuel module life falls below the first fuel module life. In an exemplary embodiment, the control system 50 is continually comparing the remaining fuel module life to a second threshold fuel module life and the control system 50 is configured to send a warning signal to a fuel cell user when the remaining fuel module life falls below the second threshold fuel module life. In one embodiment, the fuel cell system 10 includes a user override function so that the user can continue operating the fuel cell system 10 when the control system 50 is actively sending the warning signal.

Figure 4B:
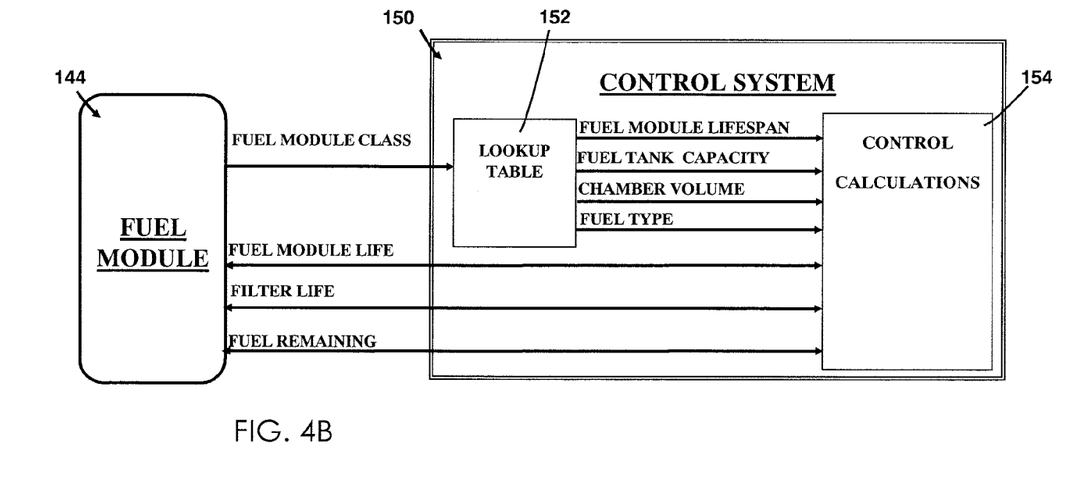
FIG. 4B depicts a schematic fluid and signal diagram of a fuel cell system in accordance with another exemplary embodiment of the present disclosure.

Referring to FIG. 4B, in an alternative embodiment, a fuel module identifier ('FUEL MODULE') 144 sends fuel module classification information ('FUEL MODULE CLASS') to the control system 150 and the control system 150 utilizes a lookup table 152 to determine a fuel module lifespan capacity level ('LIFESPAN CAPACITY'), a chamber volume level ('CHAMBER VOLUME'), and a raw fuel type ('FUEL TYPE'), a fuel tank capacity ('FUEL TANK CAPACITY').

The control calculator 154 is utilized to control actuators of the fuel cell system 10 and can be utilized to update the filter life level at each loop cycle. A remaining filter life level ('FILTER LIFE'), a remaining fuel level ('FUEL REMAINING'), and a fuel module life ('FUEL MODULE LIFE') is continuously communicated between the fuel module identifier to the control calculator 154.

In other embodiments, optimal system control parameter of fuel cell systems can vary based on the fuel module. In one embodiment, a preferred air-to-fuel ratio provided to a fuel reformer of the fuel cell system can vary based on the fuel module identification signal. For example, information from the combination of filter type and fuel type could be utilized to determine operating set points, such as fuel cell stoichiometry, fuel reforming conditions, target operating temperatures, and fuel utilization limitations. The information transmitted to the control system 50 from the fuel module 144 can be used to notify the operator of additional operational functionality or constraints for the fuel cell system, for example, the ability to invert the fuel filter or fuel tank during operation.

Figure 5A:
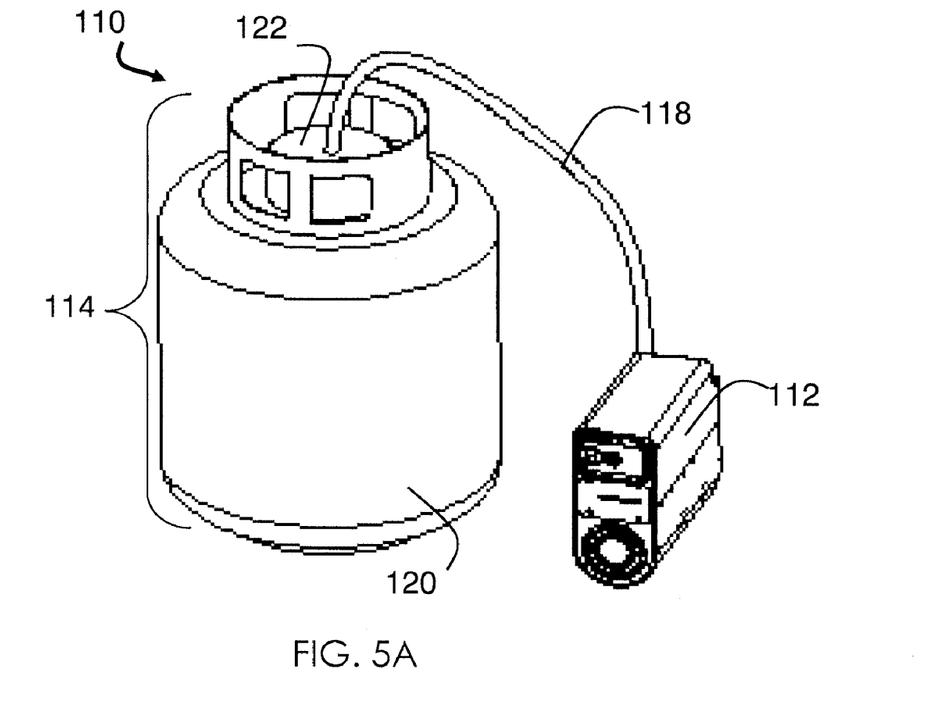
FIG. 5 depicts a prospective view of a fuel cell system in accordance with another exemplary embodiment of the present disclosure.
Figure 5B:
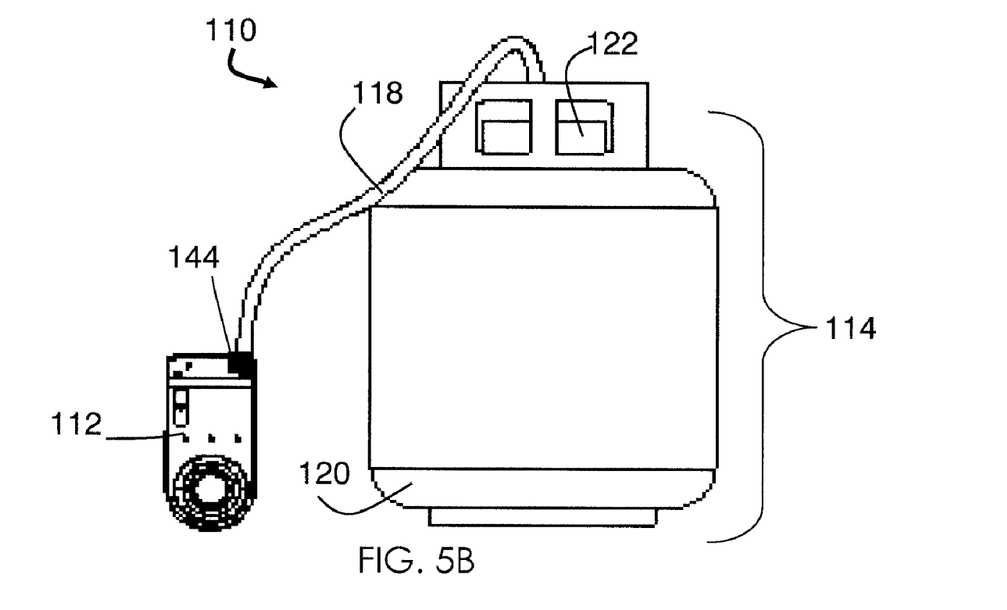

FIG. 5 depicts an exemplary fuel cell system 110 including an energy conversion module 112 and a fuel module 114 that is detachable from the energy conversion module 112. The fuel module 114 comprises raw fuel and a fuel filter (not shown) configured to refine the raw fuel. The refined fuel is routed through a fuel feed tube 118 from the fuel module 114 to the energy conversion module 112.

The fuel module 114 includes a commercial fuel tank 120 comprising a commercially available raw fuel therein that is retrofitted with filtering module 122 including a fuel identification member 144 disposed at an end of the fuel feed tube 118. The exemplary fuel identification member 144 is detachably connected to a communications port 148 of the energy conversion module 112. The fuel identification member 144 is substantially similar to the fuel identification member 44 previously described in that the fuel identification member 144 can utilize substantially similar components to store information and to communicate information with a control system (not shown) of the energy conversion module 112. The commercial tank 120 is a 20 gallon commercial propane tank, however, it to be understood that features of the fuel module 114 is adaptable to many different fuel tank sizes. The fuel identification member 124 includes encrypted handshake data such that a control system within the energy conversion module can access the encrypted handshake data to authenticate the fuel module 114.

Figure 6:
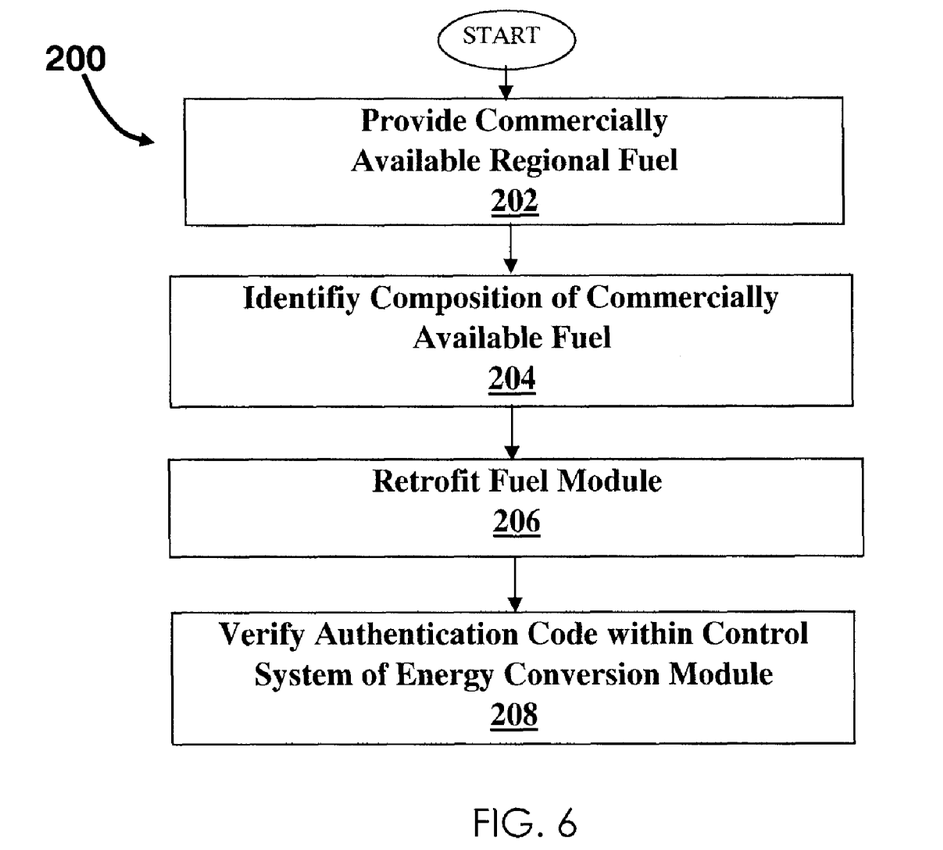
FIG. 6 depicts a flow chart diagram of a method for providing fuel to a fuel cell system.

Referring to FIG. 6 a method 200 for providing a fuel to a fuel cell is shown. The method 200 can utilize a regionally based distribution network to retrofit commercially available fuel tanks containing commercially available fuels for use within solid oxide fuel cells. At step 202, the method includes providing a commercially available regional fuel to the regional distribution center. Regional fuel as used herein, refers to fuel that can be commercially purchased in the region in which the fuel cell distribution facility is located. Each of a plurality of distribution centers located in different regions of the world can obtain commercially available fuel that is a standard composition for the region of the world.

At step 204, the composition commercially available fuel is identified. The fuel can either be identified by identifying a standard grade or classification of fuel or can be identified utilizing analytical testing such as gas chromatography testing.

At step 206, a fuel module 12 is assembled comprising the regional fuel, a fuel filter configured to refine the regional fuel and an electronic device containing an authentication code, wherein the authentication code is configured to authenticate the specific fuel utilized.

At step 208, the fuel module 12 is coupled with an energy conversion module 14 and a handshake protocol is established between the fuel module 12 and the energy conversion module 14, thereby authenticating the fuel module 12.

In an alternate embodiment, a commercial available fuel is purchased, refined at the distribution site and then supplied to a fuel module for use in a fuel cell system. For example, sulfur can be substantially removed from a regional fuel with a high sulfur content at a distribution site such that the fuel filter can comprise reduced amounts of sulfur absorbent material or can include substantially no sulfur absorbent material.

The method 200 is advantageous in fuel, which are commercially available in the specific regions of the world can be utilized thereby avoiding fuel distribution costs. Further, fuel module authentication substantially increases the likelihood that proper fuel will be utilized with the fuel cell system 10 and therefore, operational performance of the fuel cell system 10 will not be degraded by utilizing improper fuel.

One advantage utilizing the energy conversion module 14 in the fuel cell system 10 is that regional fuel compositions can be utilized and can be retrofitted into the fuel module 14. Thus, the fuel module 14 does not require world-wide distribution of a specific fuel composition, but can be adapted for utilization with fuels that are commonly distributed to a specific region of the world. The fuel modules can then at be assembled with a fuel filter 40 at local distributors, that is, the local distributor can include a fuel filter that is designed to refine the specific fuel type utilized in the fuel module 14. The fuel modules can further be assembled with the fuel module identification member 44 that can allow the control system 50 to authenticate fuel module 14 to ensure fuel refined in and provided by the fuel module 14 will not degrade operational performance of the fuel cell system 10.

The exemplary embodiments shown in the figures and described above illustrate, but do not limit, the claimed invention. It should be understood that there is no intention to limit the invention to the specific form disclosed; rather, the invention is to cover all modifications, alternative constructions, and equivalents falling within the spirit and scope of the invention as defined in the claims. Therefore, the foregoing description should not be construed to limit the scope of the invention.

The invention claimed is:

1. A fuel cell system comprising:
    a fuel module comprising a fuel tank, a fuel module identification member, and a fuel filter member, said fuel tank comprising raw fuel stored therein, said fuel filter member being configured to convert raw fuel to a refined fuel, said fuel module identification member comprising fuel module data, said fuel module data including fuel filter member information:
    an energy conversion module comprising a control module and a fuel cell stack, said control module being configured to access the fuel module data from the fuel module identification member, said fuel cell stack being configured to utilize the refined fuel to generate electrical energy,
    wherein the fuel module is detachable from the energy conversion module; and
    wherein said fuel module data is communicated between said fuel module identification member of said fuel module and said control system to provide, at least, data pertaining to a characteristic of said fuel filter member.

2. The fuel cell of claim 1, wherein the raw fuel comprises sulfur containing molecules and wherein the fuel filter member is configured to remove sulfur containing molecule from the raw fuel.

3. The fuel cell system of claim 1, wherein the raw fuel comprises propane and ethyl mercaptan and wherein the fuel filter member is configured to remove at least one of a hydrogen sulfide molecule, mercaptans, thiophenes from the raw fuel.

4. The fuel cell system of claim 1, wherein the fuel module data comprises a remaining fuel module operating life data.

5. The fuel cell system of claim 4, wherein the remaining fuel module operating life data comprises at least one of remaining fuel life data and remaining filter life data.

6. The fuel cell system of claim 4, wherein the control module is configured to monitor a fuel flow rate within the fuel cell system and wherein the remaining fuel module operating life is determined based on the monitored fuel flow rate.

7. The fuel cell system of claim 4, wherein the fuel cell system is configured to monitor a fuel cell system operating time and wherein the remaining filter life is based on fuel cell operating time.

8. The fuel cell system of claim 1, wherein the fuel module data comprises chamber volume information and wherein the control system is configured to select an operating mode based on the chamber volume information.

9. The fuel cell system of claim 1 wherein the fuel module identification member comprises a microprocessor.

10. The fuel cell system of claim 1, wherein the fuel module data comprises fuel composition data.

11. The fuel cell system of claim 1, wherein the fuel module identification member comprises identification data that identifies a unique fuel module.

12. The fuel cell system of claim 11, wherein the fuel module identifying member comprises a model number and wherein the control system is configured to access the model number and determine a control scheme based on the model number.

13. The fuel cell system of claim 1, wherein the fuel module is configured to determine filter composition information and to provide filter composition information to the control module.

* * * * *